March 22, 1960     B. B. FELTS     2,929,262
DEPRESSIBLE STEERING WHEEL FOR AUTOMOTIVE VEHICLES
Original Filed March 24, 1958
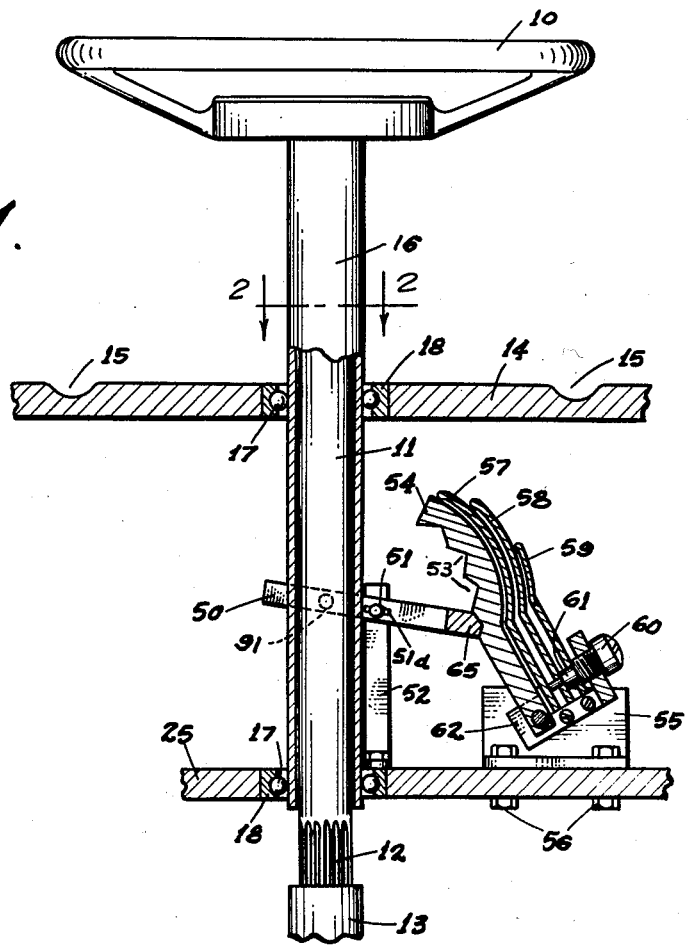
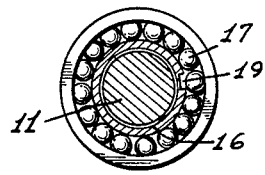
INVENTOR.
BASIL B. FELTS
BY
ATTORNEY

United States Patent Office 2,929,262
Patented Mar. 22, 1960

2,929,262

DEPRESSIBLE STEERING WHEEL FOR AUTOMOTIVE VEHICLES

Basil B. Felts, Banning, Calif.

Original application March 24, 1958, Serial No. 723,263, now Patent No. 2,888,836, dated June 2, 1959. Divided and this application March 9, 1959, Serial No. 798,303

8 Claims. (Cl. 74—493)

This invention relates to a depressible steering wheel construction for automotive vehicles. This is a divisional application of my application Serial No. 723,263, filed March 24, 1958, now Patent No. 2,888,836.

It is a well-known fact that large numbers of persons are killed or seriously injured due to impact with the steering wheel and steering assembly of an automotive vehicle upon the occurrence of a collision. It is an object of this invention to provide a depressible steering wheel construction for automotive vehicles which is adapted to automatically yield beneath the impact of the driver's body in the event of a collision. It is a further object of the invention to provide such a structure in which its yieldability does not interfere in any way with the operation and driving control of the steering assembly.

It is another object of the invention to provide a device of the type described which is simple in construction and design, requiring only a limited number of easily manufactured and assembled parts, so that it is capable of widespread use by manufacturers and the general public. It is a related object of the invention to provide such a structure which may be installed as original equipment at the time an automotive vehicle is manufactured or which may be easily, quickly and economically installed on any new automotive vehicle.

It is a further object of the invention to provide such a device in which the steering wheel may be depressed a short distance against a small amount of resistance or a greater distance against increased resistance.

In essence, my invention contemplates a depressible steering wheel assembly in which a plurality of notches or teeth are resiliently engaged in such a manner that the steering wheel may be depressed in a series of steps and in which its continued depression encounters increased resistance from the resilient means employed to resist the downward movement of the wheel.

It is accordingly an object of my invention to provide a steering assembly having all of the features and advantages of the construction set forth.

My invention also comprises such other objects, advantages and capabilities as will later more fully appear and which are inherently possessed by my invention.

While I have shown in the accompanying drawings preferred embodiments of my invention, it should be understood that the same are susceptible of modification and change without departing from the spirit of my invention.

Referring to the drawings, Fig. 1 is a side elevational view mostly in section of my steering wheel construction;

Fig. 2 is a sectional view taken on line 2—2 of Fig. 1.

A preferred embodiment which has been selected to illustrate my invention comprises a steering wheel 10, which is rotatably mounted on the upper end of a steering column 11, the lower end of which carries a plurality of splines 12 which connect it to the receiver 13. The dashboard 14 of the vehicle may be suitably padded and may be provided with depressed areas 15 for receiving the steering wheel when it is depressed.

The steering column 11 is mounted in a steering column housing 16, which passes through an opening in the dashboard 14 and is surrounded by a plurality of ball bearings 17, which are mounted in a race 18. The ball bearings 17 facilitate the downward movement of the steering column housing 16. The steering column housing 16 is provided with an elongated groove 19 into which fits a stationary element which comprises a part of or which is secured to the dashboard, in order to prevent undesirable rotation of the steering column housing 16. Similar ball bearings 17 are provided where the steering column housing 16 passes through the floor 25.

A lever arm 50 is mounted so that its midportion is pivotally secured by a pin 51 which extends through a slot 51a to a standard 52, which is secured at its lower end to the floor 25 of the vehicle. One end of the lever arm 50 is secured to the steering column housing 16 at the point 91, while the opposite end 65 engages one of a plurality of notches or steps 53 which are formed in the arcuate upper end of a rack member 54.

The lower end of the rack member 54 is pivotally secured to a base 62, which is mounted at an angle on a bracket 55 which extends upwardly from the floor 25 and which is secured thereto by bolts 56. Extending parallel to the free rack member 54 are first, second and third spring members 57, 58 and 59, respectively. An adjusting screw 60 is screw threaded through an opening in the top of the base 62 and has a stepped shank 61 which extends through the second and third spring members 58 and 59, and presses against all three spring members 57–59. The adjusting screw 60 can be tightened or loosened to adjust the pressure on the first, second and third spring members 57–59 simultaneously.

In use, when the steering column housing 16 is moved downwardly, the lever arm 50 is pivoted so that its end 65 engages successive notches or steps 53 in the free rack member 54. As the end 65 moves upwardly, it forces the end of the pivoted rack member 54 back into engagement with the first, second and third spring members 57–59, so that increased tension is provided to resist the downward movement of the steering column housing 16.

I claim:

1. A depressible steering construction for automotive vehicles comprising a steering wheel mounted on the upper end of a rotatable steering column, said steering column being rotatably mounted within a steering column housing, said housing extending through openings in the dashboard and floor of the vehicle, a plurality of ball bearings disposed around each of said openings and engaging said housing to facilitate the longitudinal movement of said housing through said openings, means for preventing the rotatable movement of said housing within said openings, a lever arm pivotally mounted adjacent its midportion to the vehicle adjacent the portion of said housing between the dashboard and floor of the vehicle, said lever arm extending substantially transversely with respect to said housing, one end of said lever arm being secured to said housing, the other end of said lever arm being free, a resilient rack secured at its lower end to the vehicle adjacent the floor, the upper end of said rack being curved and having a plurality of adjacent notches formed therein, the free end of said lever arm being adapted to engage said notches, a plurality of spring members secured to said vehicle at their lower ends and free at their upper ends, said spring members being disposed adjacent each other and closely adjacent to said rack, said steering column housing adapted upon downward movement to pivot said lever arm so that the free end thereof moves progressively upwardly along the notches in said rack, flexing said rack into progressive engagement with said spring members to progressively resist the downward movement of said steering wheel.

2. A depressible steering construction for automotive vehicles comprising a steering wheel mounted on the upper end of a rotatable steering column, said steering column being rotatably mounted within a steering column housing, a lever arm pivotally secured to the vehicle, said lever arm extending substantially transversely with respect to said housing, one end of said lever arm being secured to said housing, the other end of said lever arm being free, a resilient rack secured at its lower end to the vehicle adjacent the floor, the upper end of said rack being curved and having a plurality of adjacent notches formed therein, the free end of said lever arm being adapted to engage said notches, a plurality of spring members secured to said vehicle at their lower ends and free at their upper ends, said spring members being disposed adjacent each other and closely adjacent to said rack, said steering column housing adapted upon downward movement to pivot said lever arm so that the free end thereof moves progressively upwardly along the notches in said rack, flexing said rack into progressive engagement with said spring members to progressively resist the downward movement of said steering wheel.

3. A depressible steering construction for automotive vehicles comprising a steering wheel mounted on the upper end of a rotatable steering column, said steering column being rotatably mounted within a steering column housing, a lever arm pivotally secured to the vehicle adjacent its midportion, said lever arm extending substantially transversely with respect to said housing, one end of said lever arm being secured to said housing, the other end of said lever arm being free, a resilient rack fixed at its lower end and free at its upper end, said rack having a plurality of adjacent notches, the free end of said lever arm being adapted to engage said notches, a plurality of spring members fixed at their lower ends and free at their upper ends, said spring members being disposed adjacent each other and closely adjacent to said rack, said steering column housing adapted upon downward movement to pivot said lever arm so that the free end thereof moves progressively upwardly along the notches in said rack, flexing said rack away from said housing, said spring members progressively resisting the flexing of said rack.

4. The structure described in claim 3, the lower ends of said rack and said spring members being secured to a base, there being three of said spring members, an adjusting screw screw threadedly mounted on said base, said screw having a stepped shank, said shank extending through openings in two of said spring members so that the steps of said shank engage said spring members and the end of said shank engages the third spring member, said adjusting screw adapted to be rotated to simultaneously adjust the tension of all three of said spring members.

5. A depressible steering construction for automotive vehicles comprising a steering wheel mounted on the upper end of a rotatable steering column, said steering column being rotatably mounted within a steering column housing, a lever arm pivotally secured to the vehicle adjacent its midportion, said lever arm extending substantially transversely with respect to said housing, one end of said lever arm being secured to said housing, the other end of said lever arm being free, a resilient rack fixed at its lower end and free at its upper end, said rack having a plurality of adjacent notches, the free end of said lever arm being adapted to engage said notches, at least one spring member disposed adjacent said rack on the opposite side from said notches, said steering column housing adapted upon downward movement to pivot said lever arm so that the free end thereof moves progressively upwardly along the notches in said rack away from said housing, said spring member resisting the flexing of said rack.

6. A depressible steering construction for automotive vehicles comprising a steering wheel mounted on the upper end of a rotatable steering column, said steering column being rotatably mounted within a steering column housing, a lever arm pivotally secured to the vehicle adjacent its midportion, said lever arm extending substantially transversely with respect to said housing, one end of said lever arm being secured to said housing, the other end of said lever arm being free, a resilient rack fixed at one end and free at its other end, said rack having a plurality of adjacent notches, the free end of said lever arm being adapted to engage said notches, at least one spring member disposed adjacent said rack on the opposite side from said notches, said steering column housing adapted upon movement to pivot said lever arm so that the free end thereof moves progressively along the notches in said rack, flexing said rack away from said housing, said spring member resisting the flexing of said rack.

7. A depressible steering construction for automotive vehicles comprising a steering wheel mounted on the upper end of a rotatable steering column, said steering column being rotatably mounted within a steering column housing, an arm secured to said housing, said arm having a free end, a resilient rack fixed at one end and free at its other end, said rack having a plurality of adjacent notches, the free end of said arm being adapted to engage said notches, said steering column housing adapted upon movement to move said arm so that the free end thereof moves progressively along the notches in said rack, flexing said rack away from said housing.

8. The structure described in claim 7, and at least one spring member disposed adjacent said rack on the opposite side from said notches, said spring member resisting the flexing of said rack.

References Cited in the file of this patent

UNITED STATES PATENTS

| | | |
|---|---|---|
| 1,927,973 | Bull | Sept. 26, 1933 |
| 2,098,505 | McCullough et al. | Nov. 9, 1937 |
| 2,639,626 | Snyder | May 26, 1953 |
| 2,800,190 | Dvorak | July 23, 1957 |
| 2,876,654 | Sweitzer | Mar. 10, 1959 |